United States Patent [19]

Okochi et al.

[11] Patent Number: 5,533,159

[45] Date of Patent: Jul. 2, 1996

[54] MODULE FOR OPTICAL FIBER COMMUNICATION

[75] Inventors: Ken Okochi, Kakuta; Kimihiro Kikuchi, Marumori-machi, both of Japan

[73] Assignee: Alps Electric Co., Ltd., Tokyo, Japan

[21] Appl. No.: 370,993

[22] Filed: Jan. 10, 1995

[30] Foreign Application Priority Data

Jan. 26, 1994 [JP] Japan .................................. 6-024774

[51] Int. Cl.⁶ .................................................. G02B 6/36
[52] U.S. Cl. .................. 385/93; 385/33; 385/77; 385/78; 385/88; 385/92
[58] Field of Search ................................. 385/36, 76, 77, 385/78, 88, 92, 93, 94, 33, 34

[56] References Cited

U.S. PATENT DOCUMENTS

| | | | |
|---|---|---|---|
| 4,790,618 | 12/1988 | Abe | 385/93 X |
| 5,274,723 | 12/1993 | Komatsu | 385/92 |
| 5,315,680 | 5/1994 | Musk et al. | 385/88 |
| 5,347,604 | 9/1994 | Go et al. | 385/92 |
| 5,388,171 | 2/1995 | Michikoshi et al. | 385/36 |

FOREIGN PATENT DOCUMENTS

2-50110  2/1990  Japan .................................. 385/93 X

Primary Examiner—Brian Healy
Attorney, Agent, or Firm—Guy W. Shoup; Patrick T. Bever

[57] ABSTRACT

A module for optical communication, adapted to prevent light from being reflected on the end surface of an optical fiber when a ferrule is inserted therein, and to increase the precision with which the positioning of an end surface of the optical fiber is performed. In the module, the circumference of an anti-reflection transparent film is held in a groove of a stopper member and is pressed against the inner circumference of an elastic sleeve. When the ferrule is inserted in the sleeve, the film adheres to the end surfaces of the optical fiber and the ferrule closely and securely. Thus, no air layer is formed between the film and the end surface of the optical fiber. Laser light is not reflected on the end surface of the optical fiber. The end surface of the ferrule adheres closely to a positioning face of the stopper member, though the film intervenes therebetween. The position of the ferrule is determined so that an image point, at which an image is formed from laser light, is coincident with the end surface of the optical fiber. Thereby, the precision with which light is input to the optical fiber, can be always increased.

5 Claims, 5 Drawing Sheets

MODULE FOR OPTICAL FIBER COMMUNICATION

BACKGROUND OF THE INVENTION

1. Field of The Invention

This invention generally relates to a module for optical communication, which supplies an optical signal to an optical fiber or receives and detects an optical signal transmitted through an optical fiber. More particularly, this invention relates to a module for optical communication, which can prevent the reflection of light on an end surface of an optical fiber and can position an end surface of an optical fiber at an image point where an image is formed from light having passed through a collective or converging lens, with high precision.

2. Description of The Prior Art

Generally, a module for optical communication requires high precision connection between an optical fiber and a light emitting or receiving element.

Figure 8:
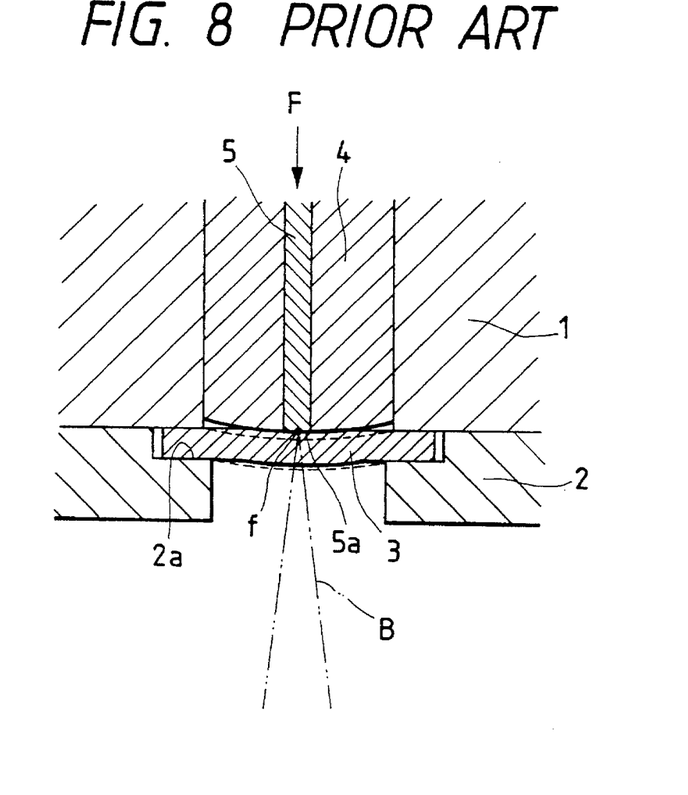
FIG. 8 is a partially sectional view of a conventional module for optical communication for illustrating problems relating thereto.

FIG. 8 is a partially sectional view of a conventional module for optical communication, which is equipped with an optical-fiber ferrule. The illustrated module is of the same type as disclosed in the description of <Embodiment 2> in the upper-left column on page 3 and FIG. 3 of the Japanese Patent Public Disclosure Official Gazette (Kokai Koho) No. 2-50110/1990.

Reference numeral 1 designates a housing (or receptacle) of the conventional module for optical communication. A holding member 2 is screwed to the bottom portion of the housing 1. A recess portion 2a is formed in an upper internal circumferential portion of the holding member 2. Further, the outer circumferential portion of a transparent plate 3 is sandwiched between this recess portion 2a and the housing 1. The transparent plate 3 is made of a material which is equal in refractive index to the material such as quartz of the core of the optical fiber. Further, the transparent plate 3 has a thickness of 0.5 mm or so. Moreover, an anti-reflection coating is formed on the bottom surface of the transparent plate 3 as viewed in this figure.

The transparent plate 3 is produced in the shape of a flat plate while being in a free state. When the housing is equipped with a ferrule 4, the ferrule 4 is pushed against the transparent plate 3 by elastic force or resilience F. Further, this resilience F deforms the transparent plate 3, so that the transparent plate 3 is concaved as illustrated in FIG. 8. Thereby, an end surface 5a of an optical fiber 5 held by the ferrule 4 and the surrounding end surface of the ferrule 4 can adhere closely to the transparent plate 3 securely and elastically.

In this conventional module for optical communication, a light emitting element realized by employing a semiconductor laser and a converging lens for focusing laser light are provided. An image is formed on the end surface 5a of the optical fiber 5 from laser light B converged by the converging lens. Thus an optical signal is input to the optical fiber 5. In the case of this conventional module, the anti-reflection coating formed on the bottom surface of the transparent plate 3 as viewed in FIG. 3 prevents the laser light B from being reflected and returned to the semiconductor laser. Further, the reflection of the laser light B on the end surface of the optical fiber 5 can be prevented due to the fact that the end surface of the optical fiber 5 adheres closely to the transparent plate 3 and thus there is no space therebetween.

Moreover, in the case of the aforementioned conventional module, when the ferrule 4 is inserted into the housing 1, the transparent plate 3 is pressed by the end surface of the ferrule 4, so that the shape of the transparent plate 3 is changed into that indicated by dashed curves in FIG. 8. Therefore, the position in a direction, in which the center axis of the end surface 5a of the optical fiber 5 extends, changes according to variation in the pressure or resilience of the ferrule 4. Thus the position of the end surface 5a thereof is unsettled.

If the elastic force F is high, the end surface 5a of the optical fiber 5 moves downwardly as viewed in this figure. In contrast, if the force F is low, the end surface 5a thereof moves upwardly. Therefore, it is difficult to make the position of the image point f, at which an image is formed from the laser light B, coincide with the position of the end surface 5a of the optical fiber 5. Further, the amount of the difference in position between the image point and the end surface 5a changes according to variation in the resilience.

Moreover, as stated above, the transparent plate 3 has a large thickness of 0.5 mm or so. Thus, when the transparent plate 3 is deformed by the resilience F, the thickness of this plate varies owing to the deflection thereof. This also causes a difference in position between the image point f and the end surface 5a.

Owing to these causes, the difference in position between the end surface 5a of the optical fiber 5 and the image point f, at which an image is formed from the laser light B, is brought about when the ferrule 4 is inserted into the housing 1. This results in reduction in precision with which an optical signal is input to the optical fiber 5.

Furthermore, an addition of the holding member 2 having the recess portion 2a to the module is also due to the large thickness of the transparent plate 3. Thus, components such as screws for fastening the holding member 2 to the housing 1 become necessary. Consequently, the number of composing elements of the module for optical communication increases and the structure of the module becomes complex.

The present invention is accomplished to solve the problems concerning the conventional module.

Accordingly, an object of the present invention is to provide a module for optical communication, which can achieve the prevention of the reflection of light on an end surface of an optical fiber with simple structure and can regulate the position of an end surface of an optical fiber relative to a converging lens with high precision.

SUMMARY OF THE INVENTION

To achieve the foregoing object, in accordance with the present invention, there is provided a module for optical communication, which comprises a sleeve in which a ferrule holding an optical fiber is inserted, a converging lens placed on an extension line of the center axis of the inserted ferrule and a light emitting or receiving device. The module for optical communication further comprises an anti-reflection transparent film provided in the sleeve. A part of the film is adapted to bend so as to adhere closely to an end surface of the optical fiber and the surrounding end surface of the ferrule. The module for optical communication further comprises a stopper member adapted to adhere closely to the end surface of the ferrule through the transparent film, said stopper member being capable of positioning the ferrule relative to the converging lens at a position where an image point, at which an image is formed from laser light having passed through the converging lens, is nearly coincident with the end surface of the optical fiber.

Further, in the case of an embodiment of this module for optical communication, a groove is formed on the outer circumference of the stopper member and a bent circumferential part of the transparent film is held in the groove.

In this embodiment, it is preferable that a plurality of projections being separated by notches and extending radially from the center of the transparent film are formed in the circumferential part, and that the projections are held in the groove.

Moreover, in the case of another embodiment of the module for optical communication, a slit portion is formed in the sleeve and extends in the longitudinal direction thereof. Furthermore, a part of the sleeve is welded and fixed to the outer circumference of the stopper member. This part of the sleeve and an end part of the slit portion are placed on the end surface of the sleeve and are symmetrical in position with respect to the center of the end surface of the sleeve.

In the module for optical communication according to the present invention, the anti-reflection transparent film bends and adheres closely to the end surface of the optical fiber and the surrounding end surface of the ferrule when the ferrule is inserted. Therefore, no air layer is formed between the end surface of the optical fiber and the transparent film. Thereby, light emitted from the light emitting device can be incident on the optical fiber without being reflected on the end surface of the optical fiber. Further, light having passed through the optical fiber can be received by the light receiving device without being reflected on the end surface of the optical fiber and returned to the inside of the optical fiber. Moreover, the end surface of the ferrule and the transparent film adhering closely thereto are positioned in such a manner that the end surface of the ferrule and the transparent film adhere closely to and come in contact with the stopper member. In this state, the end surface of the optical fiber is nearly coincident with the image point where an image is formed from the light having passed through the converging lens. Thus the precision with which light is incident on the optical fiber, as well as the accuracy with which light is output from the optical fiber, can be increased. Consequently, there occur no variations in such precision and accuracy.

Further, the transparent film can be fitted into the module by bending the circumferential part thereof in such a manner to be held in the peripheral groove of the stopper member. Thus the structure of a system for fitting the transparent film is simple.

Moreover, distortion and internal stress become hard to occur in a part of the transparent film, which adheres closely to the optical fiber, by providing the projections separated by the notches in the circumferential part of the transparent film, and further bending the projections in such a manner as to be held in the groove.

Furthermore, the slit portion extending in the longitudinal direction of the sleeve is provided therein. Thereby, the ferrule can be elastically held by the sleeve securely. Additionally, the sleeve is welded and fixed to the stopper member at a part thereof, which is located opposite to the bottom end of the slit in such a manner that the part of the sleeve and the bottom end of the slit are symmetrical in position with respect to the center of the bottom surface of the sleeve. Thereby, even when there occur variations in the outer diameters of the ferrules, the difference in position on the transverse section between the central axis of the ferrule and that of the stopper member can be minimized. In addition, by welding and fixing the sleeve to the stopper member, the sleeve can be prevented from moving when the ferrule is inserted in or detached from the module. Consequently, the transparent film inserted in the sleeve can be prevented from coming off the sleeve.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

Hereinafter, the preferred embodiments of the present invention will be described in detail by referring to the accompanying drawings.

Figure 1:
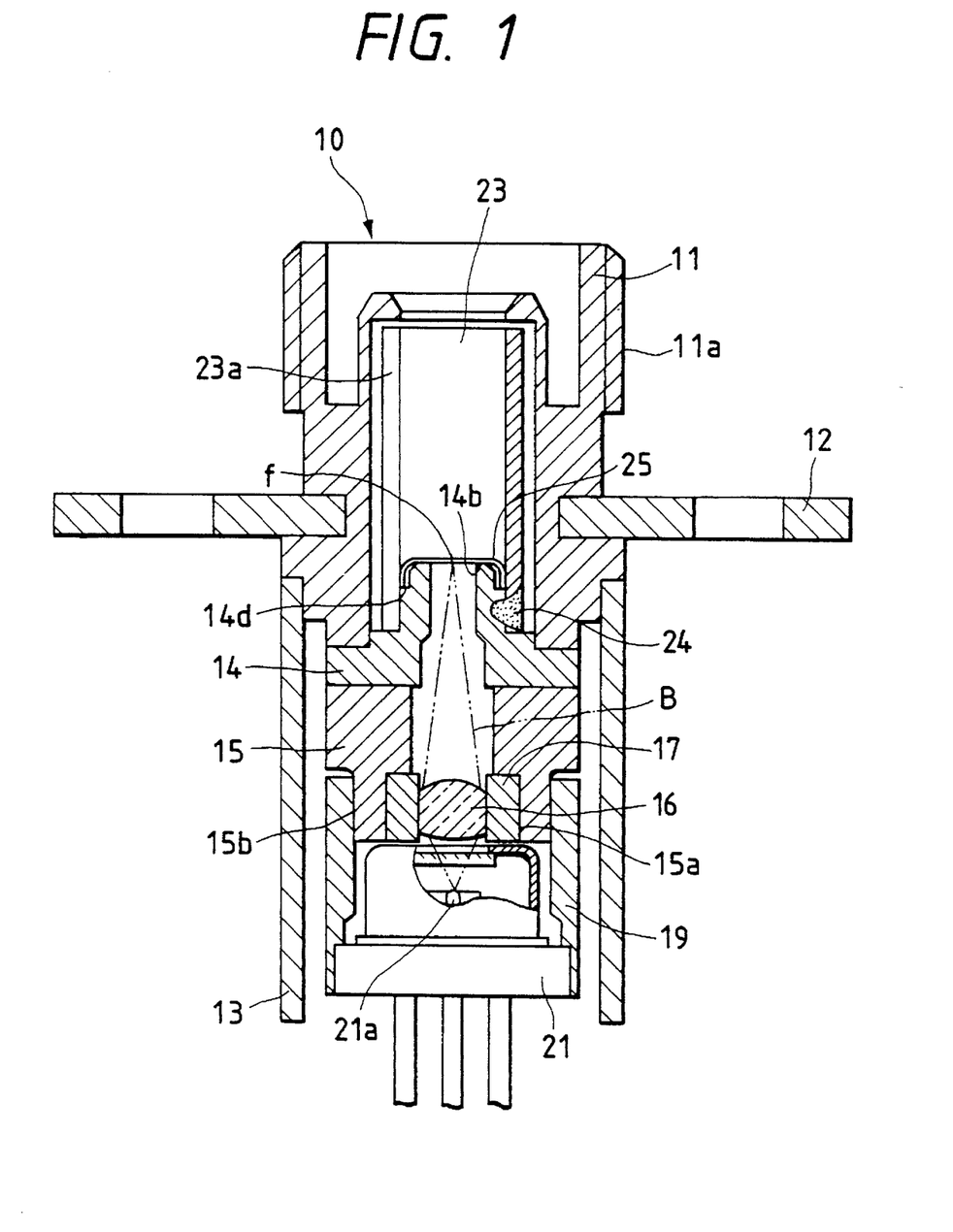
FIG. 1 is a sectional view of a light emitting module for optical communication, which is an embodiment of the present invention.
Figure 2:
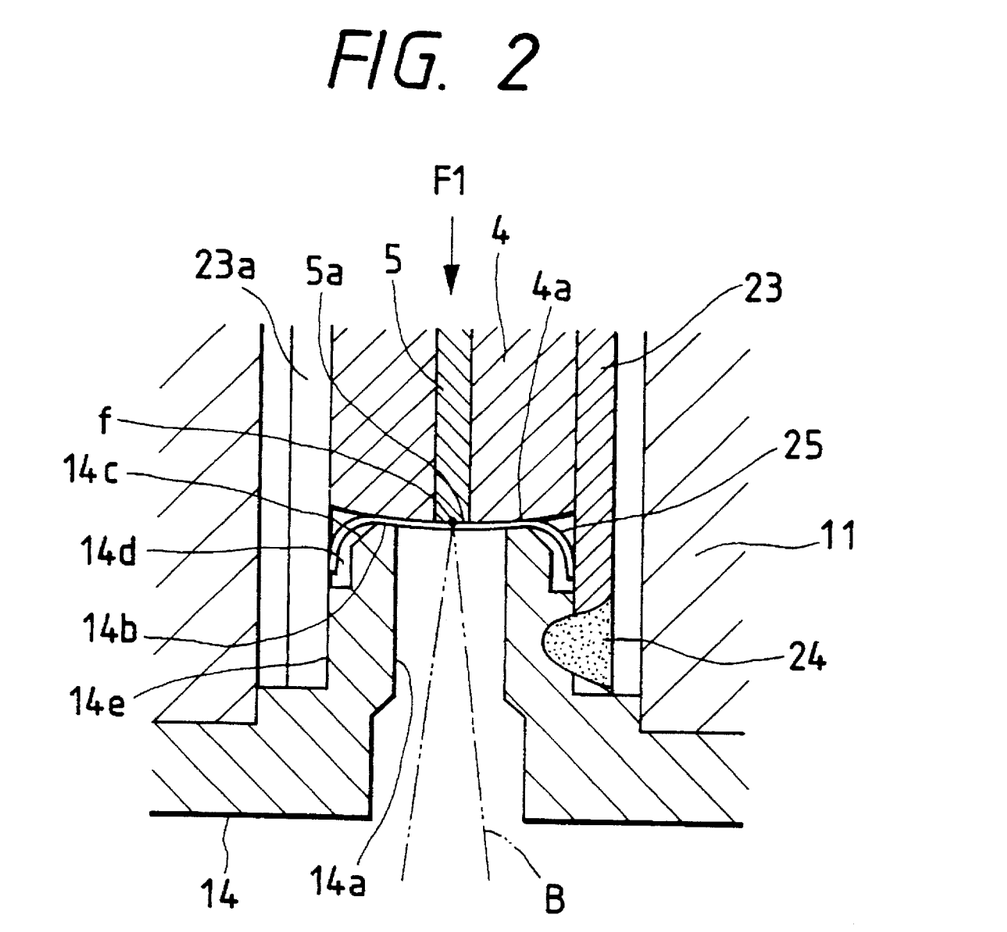
FIG. 2 is a partially sectional view of the light emitting module into which a ferrule is inserted.
Figure 3:
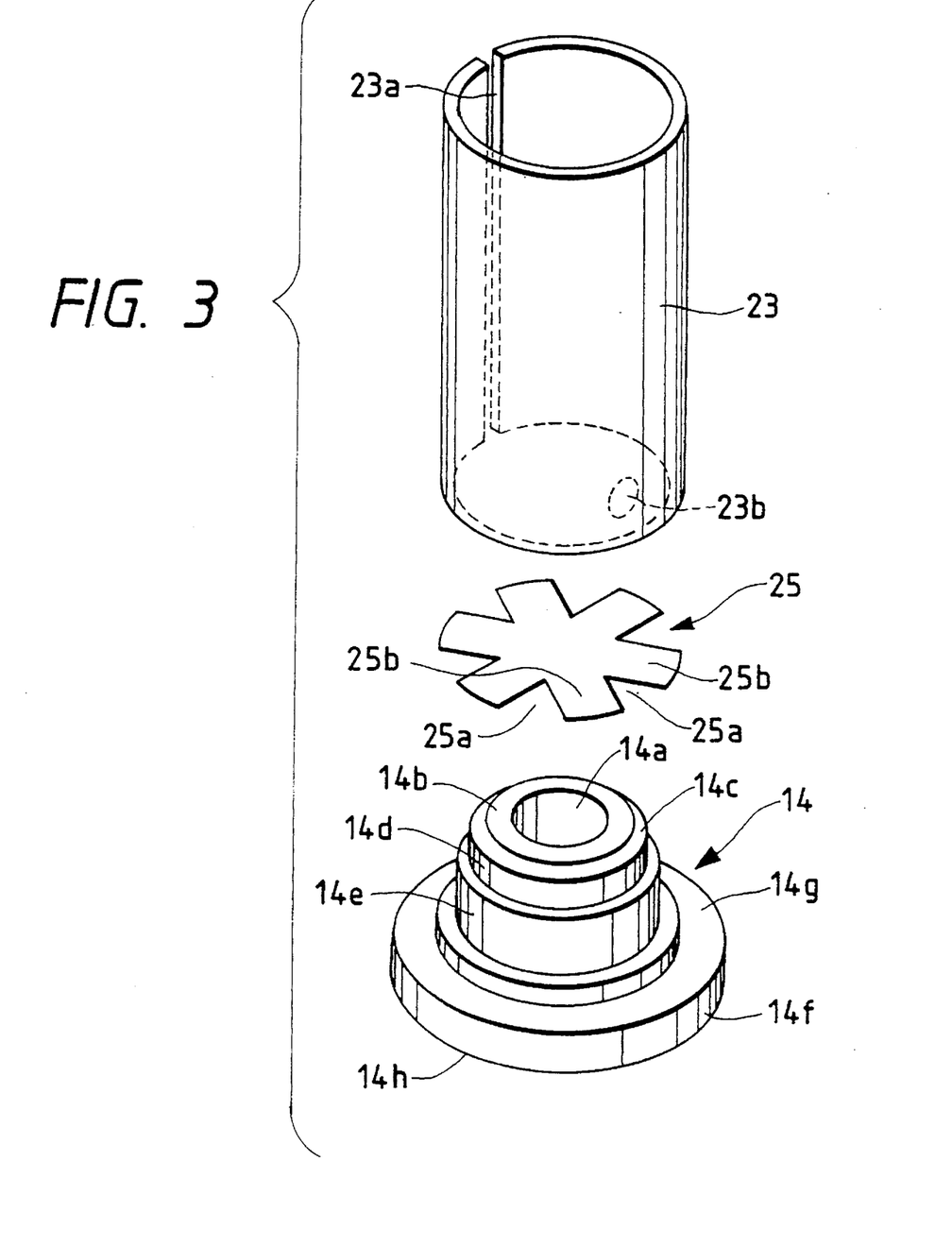
FIG. 3 is an exploded perspective view of a part of components of the light emitting module.
Figure 4:
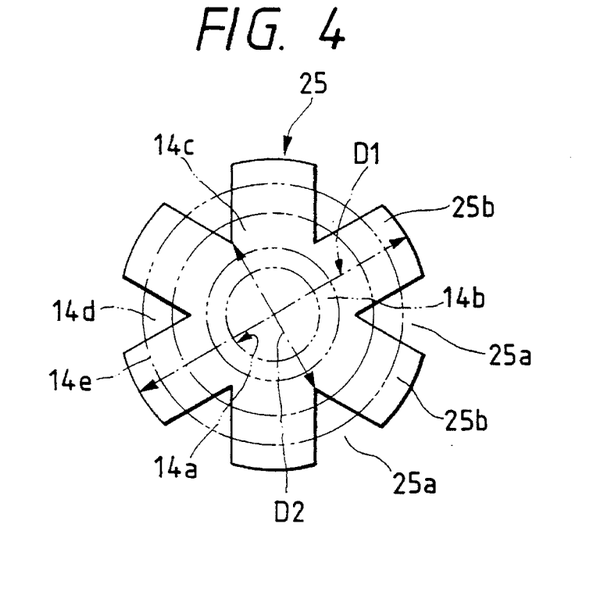
FIG. 4 is a plan view of a transparent film.
Figure 5:
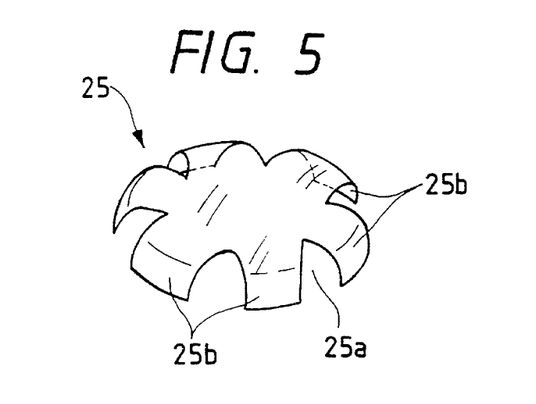
FIG. 5 is a perspective view of the transparent film transformed when loaded into the module.

FIG. 1 is a sectional view of a light emitting module for optical communication, which is an embodiment of the present invention. FIG. 2 is a partially sectional view of the light emitting module into which a ferrule is inserted. FIG. 3 is an exploded perspective view of a part of components of the light emitting module. FIG. 4 is a plan view of a transparent film. FIG. 5 is a perspective view of the transparent film transformed when loaded into the module.

As shown in FIG. 1, a housing (or receptacle) 11 is provided in the light emitting module 10. At an end of the housing 11, a male thread portion 11a to which an adapter for holding a ferrule should be screwed is formed. Furthers a mounting plate 12 is fixed to the outer circumference of the middle portion of the housing 11. Moreover, a cylindrical cover 13 is fixed to the outer circumference of the rear end portion of the housing 11.

A stopper member 14 is secured to the rear end surface of the housing 11 by means such as a welding. As also illustrated in FIG. 3, an optical path 14a is formed in the center of the stopper member 14. Further, an end surface of the stopper member 14 is a ring-like positioning face 14b. Moreover, a tapered face 14c is formed along the circumference of the positioning face 14b. Furthermore, the inner surface of a holding groove 14d is formed along and just under the circumference of the tapered face 14c at a predetermined depth therefrom. Additionally, the outer circumference of a base portion, which is formed just under the holding groove 14d and is a little larger in diameter than the groove 14d, is a sleeve fitting circumference 14e. Further, a flange 14f is formed at the bottom of the stopper member 14. Incidentally, the top surface of the flange 14f is a fixing face 14g to which the rear end surface of the housing 11 is fixed. Moreover, the bottom surface of the flange 14f is a fixing face 14h to which a lens holding body 15 is fixed.

As illustrated in FIG. 1, a lens holder 17 is fitted onto the inner circumference 15a of the base end portion of the lens holding body 15. A converging lens 16 is held by this lens holder 17. The lens holder and the converging lens 16 are preliminarily formed in such a manner to be integral with each other. Namely, the lens holder 17 is welded and fixed to the lens holding body 15. Further, an LD holder 19 is fitted onto the outer circumference 15b of the base end portion of the lens holding body 15. At the base end of the LD holder 19, a semiconductor laser 21 is mounted as a light emitting device.

The placement of the LD holder 19 and the lens holding body 15 is regulated so that the an image point f, at which an image of a light emitting point 21a of the semiconductor laser 21 is formed through the converging lens 16, is exactly or nearly coincident with an end surface 5a of an optical fiber 5 positioned on the positioning face 14b of the stopper member. After this regulating process, the LD holder 19, the lens holding body 15 and the stopper member 14 are welded and fixed together.

Figure 7:
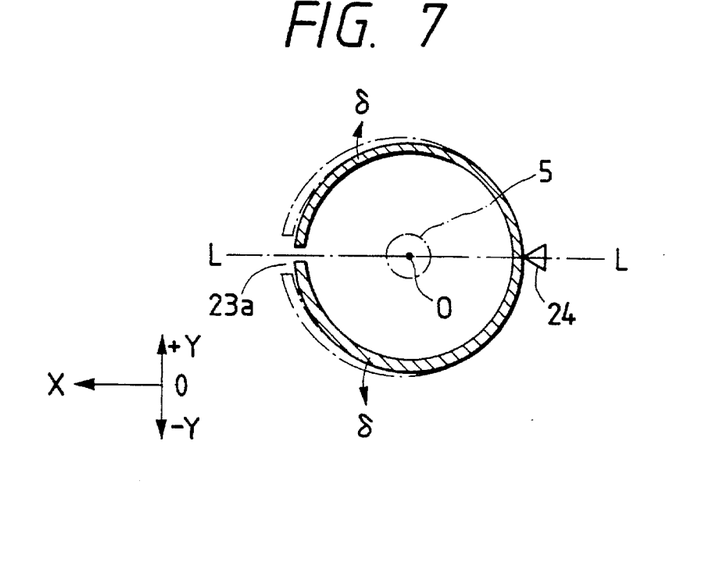
FIG. 7 is a sectional view of a sleeve transformed when a ferrule is inserted therein.

On the other hand, an elastic sleeve 23 is fitted onto the sleeve fitting circumference 14e of the stopper member 14. This elastic sleeve 23 is made of a highly elastic material such as a phosphor bronze plate and is shaped like a cylinder in such a manner that the bore or inside diameter of the sleeve 23 is a little smaller than the outer diameter of the ferrule 4. Further, in the elastic sleeve 23, a slit portion 23a extending in the longitudinal direction of the sleeve 23 is formed. As viewed in this figure, a portion located at a position on the bottom surface of the elastic sleeve 23, which is 180 degrees apart from the bottom end of the slit portion 23a symmetrically with respect to the center of the bottom surface of the sleeve 23, is a welding portion 23b. Only the position of this welding portion 23b serves as a welding fixation point at which the sleeve is welded onto the sleeve fixing circumference 14e of the stopper member 14. In FIG. 1 and FIG. 7 which is a sectional view of the elastic sleeve 23, this welding fixation point is designated by reference numeral 24.

A transparent film 25 is loaded in the inside of the base end portion of the elastic sleeve 23. Further, an anti-reflection coating is formed on a side surface of the transparent film 25, namely, the side surface thereof facing the converging lens 16. The transparent film 25 is several tens to one-hundred-and-several-tens of microns or so in thickness and thus is relatively flexible. The transparent film 25 is exactly or nearly equal in refractive index to the core of the optical fiber 5 and is made by processing synthetic resin (for example, polycarbonate and epoxy resin) or quartz glass in the shape of a film.

In the transparent film 25 used in this embodiment as shown in FIG. 3, projections 25b, 25b, . . . 25b separated by notches 25a, 25a, . . . 25a are formed in the peripheral part thereof in such a manner to extend radially and be integral with one another as illustrated in FIG. 4. Incidentally, FIG. 4 illustrates a plan view of the transparent film 25 in such a fashion that the size of the horizontal section of the transparent film 25 can be compared with the size of each of the aforementioned portions of the stopper member 14. As is seen from this figure, the maximum diameter D1 of the transparent film 25 is larger than the outer diameter of the sleeve fitting circumference 14e of the stopper member 14 (namely, the inside diameter of the elastic sleeve 23). The diameter D2 of a circular part of the film other than a ring-like part thereof, in which the notches are made, is larger than the outer diameter of the positioning face 14b of the stopper member 14. The inside end or vertex of each notch 25a is placed on the tapered face 14c. Incidentally, the diameter D2 can be established arbitrarily according to the material and the thickness of the transparent film 25, namely, according to the flexibility and the elasticity thereof. However, the diameter D2 should be larger than the diameter of the optical fiber 5 to a certain extent.

The transparent film 25 takes a flat shape (namely, a plane-like shape) in a free state after being formed. However, when loaded in the light emitting module 10, the circumferential part of the film 25 is bent elastically and downwardly as viewed in FIG. 5. Namely, the film 25 is made to take a dome-like shape. Further, the bending portion of the film 25 is inserted into the holding groove 14 of the stopper member 14. Owing to the resilience of the transparent film 25, the circumferential portion thereof tends to recover or return to a flat state and thus is pressed against the inner circumference of the elastic sleeve 23. Thereby, the transparent film 25 is prevented from coming out of the holding groove 14d. In the case of the transparent film 25 shaped as illustrated in FIG. 4, the projections 25b thereof are mainly held in the holding groove 14d. In the case where the depth of each notch is smaller than that as illustrated in this figure, a ring-like part extending along and inwardly from the circumference of the circle having the diameter D2 and the projections 25b is held in the holding groove 14d.

The circumferential part of the transparent film 25 is pressed elastically against the inner circumference of the elastic sleeve 23 in the holding groove 14d. Thus, although no means for fixing the transparent film 25 to the stopper member 14 or to the elastic sleeve 23 is provided in the module, the film 25 does not fall away from the surface of the stopper member 14.

Further, the elastic sleeve 23 is fixed to the stopper member 14 at the welding fixation point 24. Thus, when the ferrule 4 is inserted into or detached from the elastic sleeve 23, the elastic sleeve 23 is not moved with respect to the stopper member 14. Therefore, when the ferrule 4 is inserted into or detached from the elastic sleeve 23, the transparent film 25 is not moved from the surface of the stopper member 14. In view of this fact, it is unnecessary to fix the transparent film 25 by the means such as an adhesive.

Incidentally, the circumferential portion of the transparent film 25, for instance, the end portions of the projections 25b may be lightly bonded to the inner surface of the holding groove 14d or to the inner circumference of the elastic sleeve 23. Further, in the case where the transparent film is made of thermo-melting resin, the end portions of the projections 25b may be melted and fixed to the stopper member 14 or the elastic sleeve 23.

As illustrated in FIG. 2, the ferrule 4 is loaded in and is elastically held by the elastic sleeve 23. Further, a fastening member provided in a plug for holding the ferrule 4 is screwed to the male thread portion 11a of the housing 11. This screwing force is transmitted through a spring provided at the side of the plug to the ferrule 4. Thus the ferrule 4 is pushed in the direction of an arrow F1. At that time, the flexible transparent film 25 bends in such a manner to adhere closely to the end surface 5a of the optical fiber 5 and the surrounding end surface 4a of the ferrule 4. Further, the transparent film 25 adhering closely to the surface of the end surface 4a of the ferrule 4 comes in contact with the positioning face 14b of the stopper member 14. Namely, the end surface 4a of the ferrule 4 always adheres closely to and is brought into substantially abutting engagement with the positioning face 14b, though the transparent film 25 intervenes therebetween. Thus, the positioning of the ferrule 4 is completed. In the case where the end surface 4a of the ferrule 4 is processed in such a manner to have a shape like a slightly spherical surface as illustrated in FIG. 2, the end surface 4a of the ferrule 4 adheres closely to and comes in contact with the inner circumferential part of the positioning face 14b.

As described above, the module is regulated and fabricated in such a way that the image point f, at which an image of the light emitting point is formed from the laser light B having passed through the converging lens 16, is exactly or nearly coincident with the end surface 5a of the optical fiber 5 when the positioning of the ferrule 4 is achieved by means of the positioning face 14b. Therefore, the laser light B emitted from the light emitting point 21a of the semiconductor laser 21 is converged by the converging lens 16 and the image is formed at the image point which is exactly or nearly coincident with the end surface 5a of the optical fiber 5.

The anti-reflection coating formed on the surface of the transparent film at the side of the converging lens can prevent the laser light from being reflected by the transparent film 25 and being returned to the semiconductor laser 21. Moreover, the transparent film 25 and the core of the optical fiber 5, which are equal in refractive index to each other, adhere closely and securely to each other owing to the flexibility of the transparent film 25, with the result that no layer of air is formed therebetween. Thus there is no light reflected on the end surface 5a of the optical fiber 5 and returned therefrom to the semiconductor laser 21.

Additionally, the embodiment described hereinabove excels the prior art module in the function of alignment of the axis of the ferrule 4 inserted therein.

As illustrated in FIG. 7, the elastic sleeve 23 is welded and fixed to the sleeve fitting circumference 14e of the stopper member 14 only at the single welding fixation point 24 which is 180 degrees apart from the bottom end of the slit portion 23a symmetrically with respect to the center of the bottom surface of the sleeve 23. Thus, in the case where the ferrule 4 having an outer diameter slightly larger than the inside diameter of the elastic sleeve 23 is inserted, the elastic sleeve 23 is deformed and spread out equally in each of the directions indicated by reference character δ in this figure from the center line L—L drawn between the bottom of the slit portion 23a and the welding fixation point 24.

Therefore, even in the case where there occur variations of the outer diameters of the ferrules 4, the center axis O of the ferrule 4 is shifted on the line L—L only in X-direction. However, in such a case, the center axis O is not shifted in +Y-direction or −Y-direction. As a result of the fact that even in the case where there occur variations of the sizes of the ferrules 4, the center axis O of the ferrule 4 is shifted only in one direction (namely, X-direction), the precision with which the positioning of the ferrule 4 is performed can be very high. Moreover, the elastic sleeve 23 is deformed equally by an amount 6 in both of clockwise and counterclockwise directions from the line L—L. Consequently, an amount of shift of the center axis O of the ferrule 4 in X-direction is very small.

Figure 6:
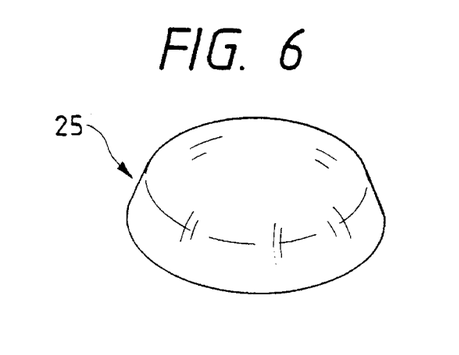
FIG. 6 is a perspective view of a transparent film transformed when loaded into another embodiment of the present invention.

Incidentally, in the case of the embodiment described hereinabove, the film having the notches 25a formed in the circumferential part thereof as illustrated in FIG. 4 is employed as the transparent film 25. However, in the case of another embodiment of the present invention, a flat disk-like transparent film 25 having no notches 25a is employed. As illustrated in FIG. 6, the circumferential part of this transparent film 25 is elastically deformed in such a manner as to have a bowl-like shape. Further, the circumferential part of this film may be inserted in the holding groove 14d of the stopper member 14.

In the foregoing description of the embodiments with reference to FIG. 1 and so on, the light emitting modules have been described as the embodiments of the present invention. Similarly, a light receiving module can be implemented according to the present invention.

In the light receiving module, a photodetector having various light receiving devices is used instead of the semiconductor laser 21. Further, in the light receiving module, light emitted from the end surface 5a of an optical fiber 5 is converged on the light receiving device by a converging lens. In this case, the prior art module has encountered a problem in that light is reflected on the end surface 5a of the optical fiber 5 and is then returned to the inside of the optical fiber owing to the difference in refractive index between the end surface 5a and the outside air. However, in the light receiving module of the present invention, a transparent film adhering to the optical fiber securely and closely is provided, so that the light can be prevented from being reflected by the end surface of the optical fiber and being returned to the inside thereof and light emitted from the optical fiber can be detected by the light receiving device with high precision.

As described above, in the case of the module according to the present invention, the reflection of light on the end surface of the optical fiber can be prevented by providing a transparent film adhering to the optical fiber closely and securely in the module. Moreover, the end surface of the ferrule is positioned in such a manner as to adhere closely to the stopper member through the transparent film. At that time, the end surface of the optical fiber is nearly coincident with the image point at which an image is formed from light having passed through the converging lens. Thereby, high-precision optical communications can always be achieved.

Further, the transparent film can be fitted into the module by bending the circumferential part thereof in such a manner as to be held in the peripheral groove of the stopper member. Thus the structure of a system for fitting the transparent film is simple.

Moreover, distortion and internal stress become hard to occur in a part of the transparent film, which adheres closely to the optical fiber, by providing the projections separated by the notches in the circumferential part of the transparent film, and bending the projections in such a manner as to be held in the groove.

Furthermore, the difference in position on the transverse section between the center axis of the ferrule and that of the stopper member can be minimized by welding and fixing to the stopper a part of the sleeve, which is located opposite to the bottom end of the slit in such a manner that the part of the sleeve and the bottom end of the slit are symmetrical in position with respect to the center of the bottom surface of the sleeve. Thereby, the precision with which the alignment of the axis of the ferrule is performed can be increased. Additionally, by welding and fixing the sleeve to the stopper member, the sleeve can be prevented from moving when the ferrule is inserted in or detached from the module. Thereby, the transparent film inserted in the sleeve can be prevented from coming off the sleeve.

Although the preferred embodiments of the present invention have been described above, it should be understood that the present invention is not limited thereto and that other modifications will be apparent to those skilled in the art without departing from the spirit of the invention.

The scope of the present invention, therefore, should be determined solely by the appended claims.

What is claimed is:

1. A module for optical communication, comprising:

a sleeve in which a ferrule holding an optical fiber is inserted;

a converging lens placed on an extension line of a center axis of the inserted ferrule;

a light emitting or receiving device;

an anti-reflection transparent film provided in the sleeve, a part of the film being adapted to bend so as to adhere closely to an end surface of the optical fiber and a surrounding end surface of the ferrule; and a stopper member adapted to adhere closely to the end surface of the ferrule through the transparent film, said stopper member being capable of positioning the ferrule relative to the converging lens at a position where an image point, at which an image is formed from laser light having passed through the converging lens, is nearly coincident with the end surface of the optical fiber.

2. The module for optical communication according to claim 1, wherein a groove is formed on an outer circumference of the stopper member and a bent circumferential part of the transparent film is held in the groove.

3. The module for optical communication according to claim 2, wherein a plurality of projections being separated by notches and extending radially from the center of the transparent film are formed in the circumferential part, and the plurality of projections are held in the groove.

4. The module for optical communication according to claim 1, wherein a slit portion is formed in the sleeve and extends in the longitudinal direction thereof, wherein a part of the sleeve is welded and fixed to an outer circumference of the stopper member, wherein the part of the sleeve and an end part of the slit portion are placed on an end surface of the sleeve symmetrically in position with respect to the center of the end surface of the sleeve.

5. The module for optical communication according to claim 1 wherein said stopper member is capable of positioning the ferrule relative to the converging lens at a position where the image point is exactly coincident with the end surface of the optical fiber.

* * * * *